UNITED STATES PATENT OFFICE.

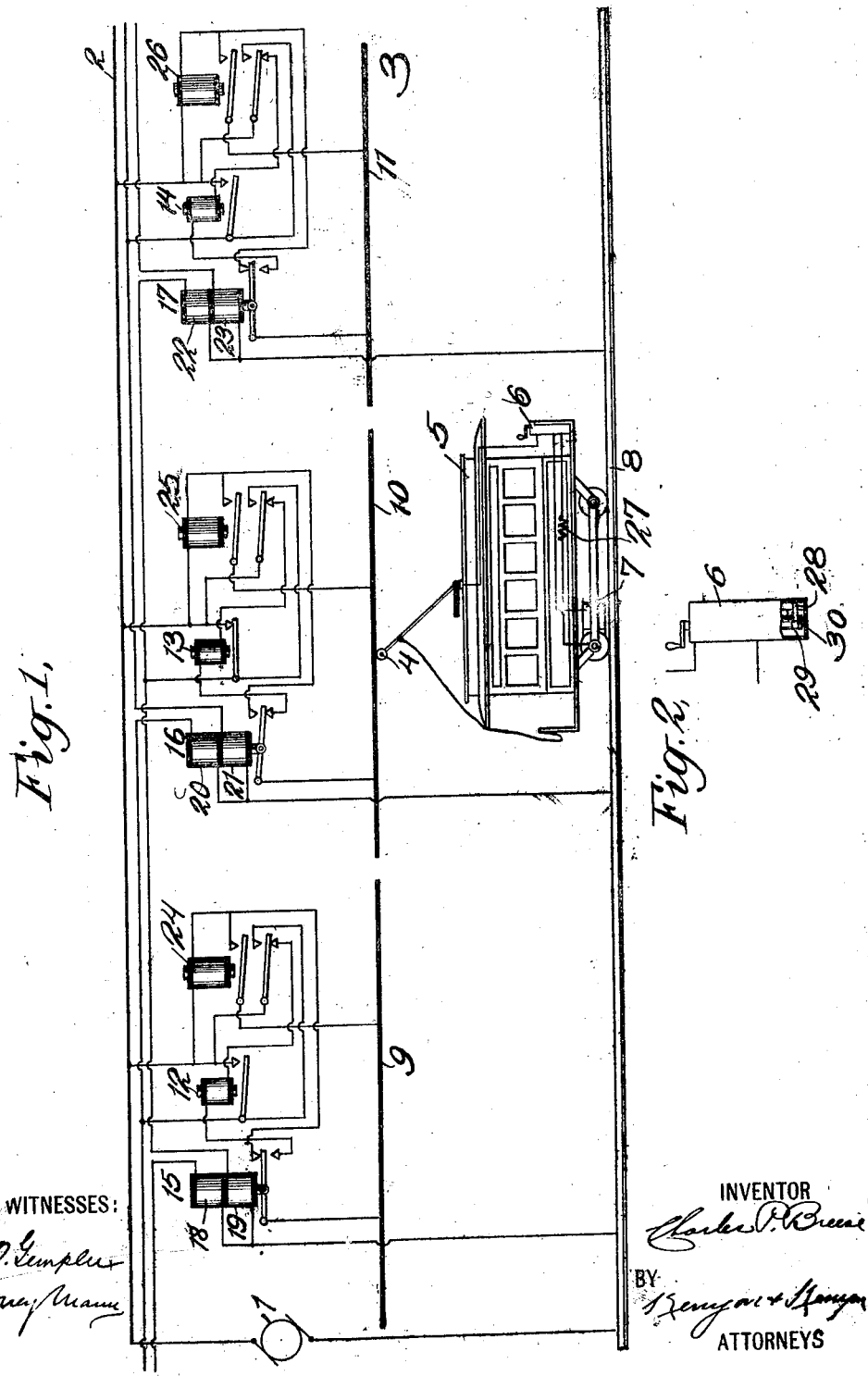

CHARLES P. BREESE, OF NORFOLK, VIRGINIA, ASSIGNOR TO HALL SIGNAL COMPANY, A CORPORATION OF MAINE.

ELECTRIC-CAR-CONTROLLING SYSTEM.

No. 862,442.        Specification of Letters Patent.        Patented Aug. 6, 1907.

Application filed August 11, 1902. Serial No. 119,186.

*To all whom it may concern:*

Be it known that I, CHARLES P. BREESE, a citizen of the United States, and a resident of Norfolk, county of Norfolk, and State of Virginia, have invented certain new and useful Improvements in Electric-Car-Controlling Systems, of which the following is a specification.

This invention relates to means for controlling electric cars, by controlling the amount of current fed to the said cars, and it has for its object, to so control the current fed to the motors of the car as to automatically prevent the cars from colliding.

The invention consists, first, in providing a plurality of bodies having different resistances connected between the feed wire and the contact wire, and means for controlling the circuits of the said resistances from different points.

The invention also consists in providing a contact wire having a plurality of contact sections, and a plurality of resistances connected to each of the said sections and means located in other sections for controlling the resistance bodies.

The invention also consists in providing means for controlling the amount of current fed to adjoining sections, by the presence of a car in any one of the given sections.

The invention also consists in providing in addition to the controlling means just described, a means for preventing any change in the flow of the current to any given section, until the circuit through that section is completely broken by the motorman.

The invention also consists in providing a shunt resistance to the motor, to permit the current to be continuously fed to the sections, unless the circuit of the shunt resistance is broken by the motorman.

The invention also consists in other features of construction and combination of parts hereinafter described and claimed.

The invention is illustrated in the accompanying drawings, in which

Figure 1 is a diagram illustrating the invention as applied to a car controlling system, and Fig. 2 illustrates one of the details of the system.

In Fig. 1, 1 indicates a source of current which is used to supply the current for operating the system; 2 indicates the main feed wire; 3 indicates the wire against which the trolley or contact wheel 4 of the car is pressed in the manner well known in the art. The trolley wheel 4 is carried by the car 5. The car 5 has the usual form of the rheostat 6 for controlling the motor 7 of the car. The circuit of the car and the controlling devices is completed through the return conductor 8. This return conductor may be a second trolley or contact wire, or the tracks together with the earth may be used as a return of the electric current to the source of current 1.

The contact wire 3 is divided into a plurality of contact sections 9, 10, and 11. These contact sections are insulated from each other, so that the current fed to each contact section may be controlled by the devices of that contact section, and if desirable with other devices in conjunction with the devices of that contact section. The current to each of the contact sections is normally fed through the electro-magnets 12, 13 and 14. These magnets are of low resistance and allow a sufficient current to pass to each of the contact sections to operate the motor or other device of the car. When a car is in circuit with one of the contact sections, the circuit is completed through the low resistance electro-magnets to the motor of the car and the return conductor 8. The low resistance electro-magnets are consequently energized, and may be used for controlling the circuit in the adjoining or other contact sections, thereby controlling the cars that may be in contact with the said other sections.

The electro-magnets 12, 13 and 14 are connected to electro-magnets associated with sections adjoining the sections of magnets 12, 13 and 14. The magnets located in the adjoining sections controlled by the low resistance magnets corresponding to magnets 12, 13 and 14 are indicated by the numerals 15, 16 and 17. Each of the magnets 15, 16 and 17 have two coils numbered respectively 18, and 19, 20, and 21, 22 and 23, which are connected to either the low resistance magnet of the section preceding, or the section succeeding the section in which the double coil resistance magnet is located. The coils are in each case connected to the armature of the low resistance magnets, and the circuits through the coils are completed by the operation of the low resistance magnets. In Fig. 1 the low resistance electro-magnet 13, completes the circuits of coil 19 of the electro-magnet 15, which is located in the section preceding that of the section of the electro-magnet 13. The electro-magnet 13 also completes the circuit of the coil 22 of the electro-magnet 17, which is located in the section succeeding the section of the electro-magnet 13. Likewise electro-magnet 12 completes the circuit of one of the coils of the electro-magnet of the preceding section, which electro-magnet corresponds to the electro-magnet 15 of section 9. Electro-magnet 12 likewise controls coil 20 of electro-magnet 16 of section 10. Also electro-magnet 14 controls coil 21 of electro-magnet 16 of section 10, and also controls one of the coils of the electro-magnet of the succeeding section, which magnet corresponds to the electro-magnet 17 of section 11. Coil 18 of electro-magnet 15 is likewise controlled by a low resistance magnet of a preceding section. Coil 23 is also controlled by a low resistance magnet of a succeeding section. Therefore, the low resistance magnets of the system associated with the contact sections may be used to control the circuits of the adjoining sections, so that when a car is in contact with any of the sections of the system, the flow of current through the contact section to the return conductor will cause the low resistance magnets of that section to operate and complete the circuit of the double coil magnets.

The coils of the electro-magnets 15, 16 and 17 are all high resistance coils, which prevents short circuiting of the magnets 12, 13 and 14, the rheostat and motor as the cars come in contact with the different contact sections. These double coil magnets may be used to control the amount of current fed to each of the contact sections. They may be so connected that when they are actuated they will change the normal connections of the contact systems so as to connect the contact sections with the high resistance bodies, and thereby reduce the amount of current fed to the said contact sections. The current may be reduced so as to be insufficient to permit the motor of a car located in that section to be actuated. If then, a car enters one of the contact sections when that contact section is connected to the source of current through the high resistance body, the car will stop, because of the lack of current to operate the motor.

In order to change the quantity of current fed to the contact sections, the low resistance electro-magnets 12, 13 and 14 are connected to the back contact of the armatures of the magnets 15, 16 and 17 respectively, whereby the magnets 15, 16 and 17 when energized will break the normal connections through the low resistance magnets 12, 13 and 14. At the same time that these normal connections are broken, the circuits of the contact sections are completed through the high resistance bodies 24, 25 and 26, which are connected to the front contact of the magnets 15, 16 and 17. The high resistance bodies 24, 25 and 26 are of sufficiently great resistance to prevent the operation of the electric motor of the car. So that, when two cars are located in adjoining sections, one of the cars will have its motor fed through the low resistance magnet, while the other of the said cars will have its motor fed through the high resistance body. This will prevent any movement of the last named car until after the other car has moved out of the adjoining section.

If the car is located in section 11, and another car is connected with the contact section 10, the low resistance magnet 14 will be energized by the current passing through the motor of the car located in section 11. Coil 21 of electro-magnet 16 will also have its circuit completed by the operation of electro-magnet 14, and the electro-magnet 16 will break the normal circuit through the electro-magnet 13, and complete the circuit through the resistance body 25, the circuit through the electro-magnet will not be able to control a car that may enter section 9. In order to control the circuits of the sections adjoining any two of the sections associated in the manner just described in connection with sections 10 and 11, I have made the resistance bodies 24, 25 and 26 in the form of magnets. Magnets 24, 25 and 26 are also connected to the double coil magnets of sections adjoining the sections of the magnets 24, 25 and 26.

When the magnets 24, 25 and 26 are energized their armatures make contact with the front contacts, which are also connected to the double coil magnets of the sections adjoining the sections of the high resistance magnets 24, 25 and 26. Magnet 25 completes the circuit of one of the coils of each of the double coil magnets of the sections adjoining the section of the magnet 25. The circuit of the coil 19 of electro-magnet 15 is completed by the operation of the electro-magnet 25, as well as by the operation of magnet 13. The circuit of coil 22 of electro-magnet 17 is also completed by the operation of the electro-magnet 25. Likewise electro-magnet 24 completes the circuit of one of the coils of the double coil magnet of the preceding section, and also coil 20 of the double coil 16 of the succeeding section 10, and magnet 26 completes the circuit of coil 21 of the electro-magnet 16, and also one of the coils of the double coil magnet of the succeeding section. If then, a car enters a section adjoining the sections 10 and 11, the circuits of the said adjoining section corresponding to the magnets 24, 25 and 26, and the amount of current fed to the said adjoining section will be insufficient to cause the motor of the cars entering this section to operate, and the cars of the said adjoining section will stop.

In order to further protect the electric car system, and to prevent the burning out of the contacts of the controlling instruments of the different sections, a means is provided whereby the car will not receive any increase current after the quantity is once reduced by the controlling instruments, until motorman breaks the circuit connections between the instruments of the contact section and the return conductor. This is done by preventing the resetting of the instruments to their normal condition until after the circuit is broken by the motorman. When therefore electric cars are located in adjoining sections, the quantity of current fed to one of the said cars will be greatly reduced. The car cannot proceed until after the motorman of that car has completely broken the circuit through the car. This will prevent any collision between the cars.

To prevent the resetting of the instruments the magnets 24, 25 and 26 are provided with additional armatures which directly connect these magnets to their respective contact sections when the magnets are energized. These magnets being of high resistance, and being operated only when the current to the sections is to be reduced to such a degree that the cars in contact with this section cannot proceed, the energization of these magnets will directly connect them with the contact sections, and short circuit the armature and the front contact of the double coil electro-magnets 15, 16 and 17. The current will therefore pass through these magnets 24, 25 and 26, as long as the car remains in contact with their respective contact sections, unless the circuit through the car is broken by the motorman. When the circuit is broken between the contact sections and the return conductor, the electro-magnets 24, 25 and 26 are deënergized, which permits the current to once more pass through the low resistance magnets 12, 13 and 14, and in a quantity sufficient to operate the motor and allow the car to proceed.

In the figure the low resistance magnets 12, 13 and 14 are connected to the back contacts of one of the armatures of the magnets 24, 25 and 26. The circuits of the magnets 12, 13 and 14 are broken by the operation of the magnets 24, 25 and 26 as well as by the magnets 15, 16 and 17. then the magnets 15, 16 and 17 become deënergized the magnets 24, 25 and 26 will still control the circuit of the magnets 12, 13 and 14 until the circuit between the contact section and the return conductor is broken.

In order that a sufficient quantity of the current may pass through the instruments of the contact sections to operate them, there is provided a by-pass to the motor of the car. This by-pass has a resistance 27, sufficiently great to prevent short circuiting of the motor and yet to allow the controlling instruments of the section to operate. This by-pass or shunt may be connected to a contact 28, carried on the rheostat frame of the motor and circuit may be completed through the segment 29 located upon the cylinder or rod 30, which is operated by the motorman.

The operation of my invention is as follows: If a car is connected to contact section 10 by means of the trolley wheel 4, a circuit is completed from the source of current 1, the main feed wire 2, the low resistance magnet 13, contact section 10, the car 5, return conductor 8, back to the source of the current 1. This permits of the flow of a sufficient current to operate the motor 7, and the car proceeds along the track. The electro-magnet 13 is energized, and a circuit from the source of the current 1, the main feed wire 2, is closed through the armature of the magnet 13 to coil 19 of the electro-magnet 15, the return conductor 8 to the source of current. A circuit is also completed from the main feed wire 2, the armature of the electro-magnet 13, coil 22 of electro-magnet 17, the return conductor 8, to the source of current 1. The electro-magnets 15 and 17 will therefore operate upon their respective armatures and break the normal connection between the main feed wire 2, the low resistance magnets 12 and 14, to the respective contact sections, and connect the said contact sections 9 and 11 with the main feed wire 2, through the high resistance magnets 24 and 26. If now, while car 5 is in contact with contact section 10, a car makes contact with either contact section 9 or 11, the current fed to that car will be insufficient to permit the motor to be actuated, and the car thus entering either of the adjoining sections will be compelled to stop. If a car enters section 9 while another car is in contact with contact section 10, the flow of the current to the contact section 9, and through the car in contact therewith, will energize electro-magnet 24, which will operate its armature to break the connections between the low resistance electro-magnet 12 and the main feed wire 2, and will connect one of the coils of the double coil magnet of the preceding section with the main feed wire 2. This will in turn energize the double coil electro-magnet of the preceding section and the high resistance electro-magnet of that section will be also connected with the contact section and with the main feed wire, and the quantity of current fed to that contact section will also be reduced. If then, a car enters the section preceding to section 9, the motor of the car will become inoperative, and the car will be compelled to stop. The electro-magnet 24 also operates to directly connect the contact section with itself, so that, as soon as the car makes contact with contact section 9, the current continues to flow through the high resistance magnet 24, independent of the armature of the double coil electro-magnet 15. The current will thus continue to flow through the electro-magnet 24, until the electro-magnet 15 is deënergized by the removal of the car 5 out of contact with contact section 10, and until the circuit between contact section 9 and the return conductor 8 is broken.

The operation of the system is the same in the sections succeeding the section in which car 5 is located; since the electro-magnet 13 controls the double coil magnet of the succeeding sections in the same way that it controls the double coil magnets of the preceding sections. And the electro-magnet 26 controls the double coil electro-magnet of the succeeding section in the same way that the electro-magnet 24 controls the double coil magnet of the preceding section. It will thus be seen that the car will control the adjoining sections, so as to completely prevent any collision between the cars of the system.

What I have just described is the preferable form of my invention, the instrumentalities, however, may be greatly varied without in any way departing from the spirit of my invention. The same controlling mechanism may be used for operating signals located either along the track of the car, or within the car, which would signal to the motorman the presence of a car in an adjoining section.

What I claim as new and desire to secure by Letters Patent is:—

1. In an electric car controlling system, the combination of a main feed conductor, a contact conductor having a plurality of contact sections, an electro-magnet normally connected to the said main feed conductor and to one of the said contact sections and through which the operating current is fed to the motor of the car, and means controlled by the said electro-magnet for controlling the amount of current fed to a section in front of the section to which the said electro-magnet is connected, as well as that fed to a section in the rear of said section.

2. In an electric car controlling system, the combination of a main feed conductor, a contact conductor having a plurality of contact sections, a plurality of low resistance electro-magnets one for each section each normally connected to the said main feed conductor and to a contact section and through which the operating current is fed to the motor of the car, and means controlled by the said low resistance electro-magnets for controlling the amount of current fed to a section in front of the sections to which the said electro-magnets are connected, as well as that fed to a section in the rear of said sections.

3. In an electric car controlling system, the combination of a main feed conductor, a contact conductor having a plurality of contact sections, a low resistance body and a high resistance body connected to the said main feed conductor and each of the said sections, and means controlled by the said high resistance and the said low resistance body for controlling the amount of current fed to each of the sections adjoining the section of the said high resistance body and the said low resistance body.

4. In a car controlling system the combination of a main feed conductor, a contact conductor having a plurality of contact sections, a controlling electromagnet associated with each of said sections for controlling the current fed from the said main conductor to the said contact conductor, a low resistance electromagnet adapted to receive motor current, associated with a section in front and another low resistance electromagnet associated with a section in the rear of each section with which the controlling electromagnet is associated, said low resistance electromagnets being normally connected with said contact sections and being arranged to control the controlling electromagnet.

5. In an electric car controlling system, the combination of a main feed conductor, a contact conductor and a plurality of contact sections, a high resistance body and a low resistance body connected to the said main feed conductor and each of the said contact sections, an electromagnet for controlling the circuit through the said resistance bodies and controlled by the said resistance bodies of each of the sections adjoining the section of the said electro-magnet.

6. In an electric car controlling system, the combination of a main feed conductor, a contact conductor having a plurality of contact sections, a return conductor, a high resistance electro-magnet and a low resistance magnet connected to the said main feed conductor and each of the said contact sections, an electro-magnet controlled by the high resistance magnet and the low resistance magnet of each of the two sections adjoining the section of the said electro-magnet and for controlling the circuit of the high resistance magnet and the low resistance magnet of the section of the said electro-magnet.

7. In an electric car controlling system, the combination of a main feed conductor, a contact conductor having a plurality of contact sections, a return conductor, a high resistance magnet and a low resistance magnet connected to the said main feed conductor and associated with each of the said contact sections, a double coil magnet for controlling the circuits of the said high resistance magnet and the said low resistance magnet, the circuit of one of the said coils being controlled by the low resistance magnet of each of the preceding sections, and the other of the said coils being controlled by the low resistance magnet of each of the succeeding sections.

8. In an electric car controlling system, the combination of a main feed conductor, a contact conductor having a plurality of contact sections, a return conductor, a high resistance body and a low resistance body connected to the said main feed conductor and in a circuit with each of the said contact sections, a double coil electro-magnet for controlling the circuit of each of the said resistance bodies.

9. In an electric car controlling system, the combination of a main feed conductor, a contact conductor having a plurality of contact sections, a return conductor, a high resistance body and a low resistance body connected to the said main feed conductor and associated with each of the said sections, a double coiled electro-magnet for controlling the circuits of the said high resistance body and the said low resistance body, one of said coils being controlled by the said low resistance body of the preceding section, and the other of the said coils being controlled by the low resistance body of each of the succeeding sections.

10. In an electric car controlling system, the combination of a main feed conductor, a contact conductor having a plurality of contact sections, a return conductor, a high resistance electro-magnet and a low resistance electro-magnet connected to the said main feed conductor and associated with each of the contact sections, a double coil electro-magnet for connecting either the high resistance electro-magnet with the contact section or the low resistance electro-magnet with the contact section, means associated with the preceding section for controlling the circuit of one of the said coils and means associated with the succeeding sections for controlling the circuit of the other of the said coils.

11. In an electric car controlling system, the combination of a main feed conductor, a contact conductor having a plurality of contact sections, a return conductor, an electro-magnet associated with each of the contact sections and means associated with each of the contact sections adjoining the section of the said electro-magnet for controlling the amount of current flowing to the said section of the said electro-magnet and means associated with the said section of the said electro-magnet for preventing a change in the amount of current through the said section until the circuit between the said section and the return conductor is broken.

12. In an electric car controlling system, the combination of a main feed conductor, a contact conductor having a plurality of contact sections, a return conductor, a high resistance body and a low resistance body connected with the said main feed conductor and associated with each of the said sections, an electro-magnet for controlling the circuit of the said high resistance body and the said low resistance body and means associated with each of the sections adjoining the section of the said high resistance body and the said low resistance body for controlling the said electro-magnet, and means controlled by the said high resistance body for connecting the said high resistance body directly to its contact section independently of the said electro-magnet.

13. In an electric car controlling system, the combination of a main feed conductor, a contact conductor having a plurality of contact sections, a return conductor, a high resistance electro-magnet and a low resistance electro-magnet connected to the said main feed wire and associated with each of the said contact sections, a double coil electro-magnet for connecting either the high resistance electro-magnet or the low resistance electro-magnet with the contact section, one of the said coils being controlled by either the high resistance electro-magnet or the low resistance electro-magnet of the preceding section, the other of the said coils being controlled by either a high resistance electro-magnet or the low resistance electro-magnet of the succeeding section, an armature controlled by the said high resistance electro-magnet for connecting the said high resistance electro-magnet to the contact section independently of the said double coil electro-magnet, whereby the flow of current through one of the said contact sections and the motor of the car to the return conductor will control the amount of current fed to each of the sections adjoining the said section.

14. In an electric car controlling system, the combination of a main feed conductor, a contact conductor having a plurality of contact sections, a low resistance body and a high resistance magnet connected to the said main feed conductor and associated with each of the said contact sections, an actuating means for operating the said car, a high resistance body in shunt with the said actuating means, whereby a sufficient current is allowed to pass through the said high resistance electro-magnet until the said shunt circuit is broken.

15. In an electric car controlling system, the combination of a main feed conductor, a contact conductor having a plurality of contact sections, a return conductor, a low resistance magnet and a high resistance magnet, means for connecting either of the said magnets to each of the said contact sections, a motor for operating the said car, a high resistance body in shunt with the said motor for allowing sufficient current to pass through the said high resistance electro-magnet to cause said high resistance electro-magnet to be operated.

16. In an electric car controlling system, the combination of a main feed conductor, a contact conductor having a plurality of contact sections, a low resistance body connected to the said main feed conductor and to each of the contact sections, and means controlled by the said low resistance body and associated with other of the sections than that of the low resistance body for controlling the amount of current fed to each of the said other sections.

17. In an electric car controlling system, the combination of a main feed conductor, a contact conductor having a plurality of contact sections, a low resistance body and a high resistance body connected to the said main feed conductor and each of the said sections, and means controlled by the said high resistance and the said low resistance body for controlling the amount of current fed to sections other than the section of the said high resistance body and the said low resistance body.

18. In a car controlling system, the combination of a main feed conductor, a contact conductor having a plurality of contact sections, an electromagnet normally connected to the said main feed conductor and to one of the said contact sections and through which the operating current is fed to the motor of the car, and means controlled by the said electromagnet for controlling the amount of current fed to a section in front of and a section in the rear of the section to which the said electromagnet is connected.

19. In an electric car controlling system, the combination of a main feed conductor, a contact conductor having a plurality of contact sections, an electro-magnet normally connected to the said main feed conductor and to one of the said contact sections and through which the operating current is fed to the motor of the car, and means controlled by the said electro-magnet for reducing the amount of current fed to each section adjacent to the section to which the said electro-magnet is connected.

20. In a car controlling system, the combination of a main feed conductor, a contact conductor having a plurality of contact sections, a controlling electro-magnet associated with each of said sections for reducing the current fed from the said main conductor to the said contact conductor, a low resistance electro-magnet adapted to receive motor current associated with a section in front of and adjacent to the section with which the controlling electro-magnet is associated and another low resistance electro-magnet associated with a section adjacent to and in the rear of each section with which the controlling electro-magnet is associated, said low resistance electro-magnets being normally connected with said contact sections and being arranged to control the controlling electro-magnet.

21. In a car controlling system, the combination of a main feed conductor, a contact conductor having a plurality of contact sections, an electro-magnet normally connected to the said main feed conductor and to one of the said contact sections and through which the operating current is fed to the motor of the car, and means controlled by the said electro-magnet for reducing the amount of current fed to a section adjacent to and in front of and a section adjacent to and in the rear of the section to which the said electro-magnet is connected.

In testimony whereof, I have signed my name to this specification, in the presence of two subscribing witnesses.

CHARLES P. BREESE.

Witnesses:
FINLAY FORBES FERGUSON,
CHAS. J. CALROW.